UNITED STATES PATENT OFFICE.

VICTOR JOSEPH GARIN, OF ANNEMASSE, AND FERNAND DAVID, OF CETTE, FRANCE, ASSIGNORS TO COMPAGNIE FRANÇAISE DES PRODUITS TARTRIQUES, OF BEZIERS, FRANCE.

PROCESS OF TREATING SUBSTANCES CONTAINING CRUDE TARTAR.

No. 898,866.      Specification of Letters Patent.      Patented Sept. 15, 1908.

Application filed April 5, 1907. Serial No. 366,527.

*To all whom it may concern:*

Be it known that we, VICTOR JOSEPH GARIN, chemist, and FERNAND DAVID, engineer, both citizens of the Republic of France, residing, respectively, at Annemasse, Haute Savoie, and Cette, Herault, France, have invented an Improved Process of Treating Substances Containing Crude Tartar, of which the following is a specification.

This invention has for object an improved process for treating substances containing crude tartar whereby coloring matters contained therein are rendered insoluble.

The improved process is based upon the use of formaldehyde in the form of solution called formalin in commerce, or that of its polymer, trioxymethylene.

The process is applicable to the treatment of green or dry wine lees, crude tartar, still crystals and the like, and generally to the treatment of all substances containing tartrous matters.

The substances to be treated, whether damp or dry, are mixed with a quantity of formalin which may vary with each case but approximate to from 1 to 2 per cent. The mixture is made in any suitable malaxator and in as intimate a manner as possible. The magma obtained is dried at a temperature of nearly 100 degrees centigrade and is again pulverized if necessary. The substance obtained can then be used in the manufacture of tartaric products as in the case of the materials ordinarily employed for such purpose. The action of the formaldehyde on the albuminoid substances present in the crude material fixes the coloring matters in the form of an insoluble lake. The decantation and filtration of these substances are thus rendered very easy. The liquids have but very little color and white crystals are obtained therefrom straight away.

If the proportion of the albuminoid substances be too small in proportion to the coloring matters to effect the desired result as in the case of tartar or still crystals for example, it may be increased previously by adding such substance in the form for examples of blood, white of egg, casein, or beer yeast.

In the case of tartar itself, the proportion of 4 per cent. of blood, diluted with sufficient water to absorb the tartar, gives a satisfactory result.

What we claim is:—

1. In the treatment of substances containing crude tartar to facilitate the removal of the coloring matter therein, the addition thereto of a substance of formaldehyde character.

2. In the treatment of substances containing crude tartar to facilitate the removal of the coloring matter therein, the addition thereto, in the presence of an albuminoid, of a substance of formaldehyde character.

3. In the treatment of substances containing crude tartar to facilitate the removal of the coloring matter therein, the addition thereto of an albuminoid and a substance of formaldehyde character, substantially as described.

4. In the treatment of substances containing crude tartar to facilitate the removal of the coloring matter therein, the addition thereto, in the presence of an albuminoid, of a substance of formaldehyde character and of a dissolving fluid whereby said coloring matter is carried down in the form of an insoluble lake, substantially as described.

Signed at Cette this 22d day of March, 1907.

VICTOR JOSEPH GARIN.
    FERNAND DAVID.

Witnesses:
    N. RIVSCHONEN,
    COMBARI.